(12) United States Patent
Dicke et al.

(10) Patent No.: US 7,093,953 B1
(45) Date of Patent: Aug. 22, 2006

(54) WARNING LIGHT

(75) Inventors: Grant Donald Dicke, Downers Grove, IL (US); Ian Wareing, Leyland (GB)

(73) Assignee: Dicke Tool Company, Downers Grove, IL (US)

( * ) Notice: Subject to any disclaimer, the term of this patent is extended or adjusted under 35 U.S.C. 154(b) by 0 days.

(21) Appl. No.: 11/144,557

(22) Filed: Jun. 3, 2005

(51) Int. Cl.
*F21L 4/00* (2006.01)

(52) U.S. Cl. ............ 362/196; 362/157; 362/191; 362/800; 362/363; 340/907

(58) Field of Classification Search ............ 362/157, 362/191, 196, 362, 363, 800; 340/907, 908, 340/908.1
See application file for complete search history.

(56) References Cited

U.S. PATENT DOCUMENTS

| 4,475,101 A | 10/1984 | Kulp et al. |
|---|---|---|
| 4,710,053 A | 12/1987 | Kulp et al. |
| 5,664,874 A | 9/1997 | Winterer |
| 6,366,214 B1 * | 4/2002 | Mitchell et al. ........ 340/815.45 |
| 2003/0222791 A1 * | 12/2003 | Smalls ..................... 340/908 |
| 2004/0046678 A1 * | 3/2004 | Grady, Jr. ................. 340/908 |

* cited by examiner

*Primary Examiner*—Stephen F Husar
*Assistant Examiner*—Meghan K. Dunwiddie
(74) *Attorney, Agent, or Firm*—Olson & Hierl, Ltd.

(57) ABSTRACT

A lighting apparatus includes a lens assembly with mating first and second lens members forming a hollow interior, and an internal assembly including an inner housing. The inner housing is generally triangular-shaped and includes an upper corner, a pair of lower corners and hollow leg portions between the corners. An LED lamp is mounted in the hollow interior of the inner housing, at an upper corner thereof. A circuit board carrying at least one switch is disposed in the hollow leg portion extending between the lower corners of the inner housing, and electrical wiring is disposed in a leg portion, connecting the LED lamp to the circuit board. The base includes a base housing defining a hollow interior and a battery holder received within the hollow interior.

16 Claims, 8 Drawing Sheets

WARNING LIGHT

TECHNICAL FIELD

The invention relates generally to warning lights and more particularly to portable warning lights suitable for use with temporary barricades and other traffic channelizing devices.

BACKGROUND

Several arrangements have been proposed for portable, battery powered warning lamps. Typically, these arrangements include a lens assembly mounted to a battery compartment. Over the years, controls and other circuit components have been added to these arrangements, as the need for additional features has arisen. However, improvements in the construction cost and performance are still being sought. Thus, a need exists for more cost efficient, better performing warning light assemblies.

SUMMARY

The invention in one implementation encompasses an apparatus. The apparatus comprises lighting apparatus, such as that used to warn pedestrians and motorists, comprising a lens assembly comprising mating first and second lens members forming a hollow interior, an internal assembly including a generally triangular-shaped inner housing having a hollow interior and a base. The inner housing is generally triangular-shaped and includes an upper corner, a pair of lower corners and hollow leg portions between the corners. At least one LED lamp is mounted on a mounting board disposed in the hollow interior of the inner housing, at an upper corner thereof. A circuit board carrying at least one switch is disposed in the hollow leg portion extending between the lower corners of the inner housing, and electrical wiring is disposed in at least one leg portion, connecting the at least one LED lamp to the circuit board. The base includes a base housing defining a hollow interior and a battery holder received within said hollow interior.

DESCRIPTION OF THE DRAWINGS

Features of exemplary implementations of the invention will become apparent from the description, the claims, and the accompanying drawings in which:

DETAILED DESCRIPTION

Figure 1:
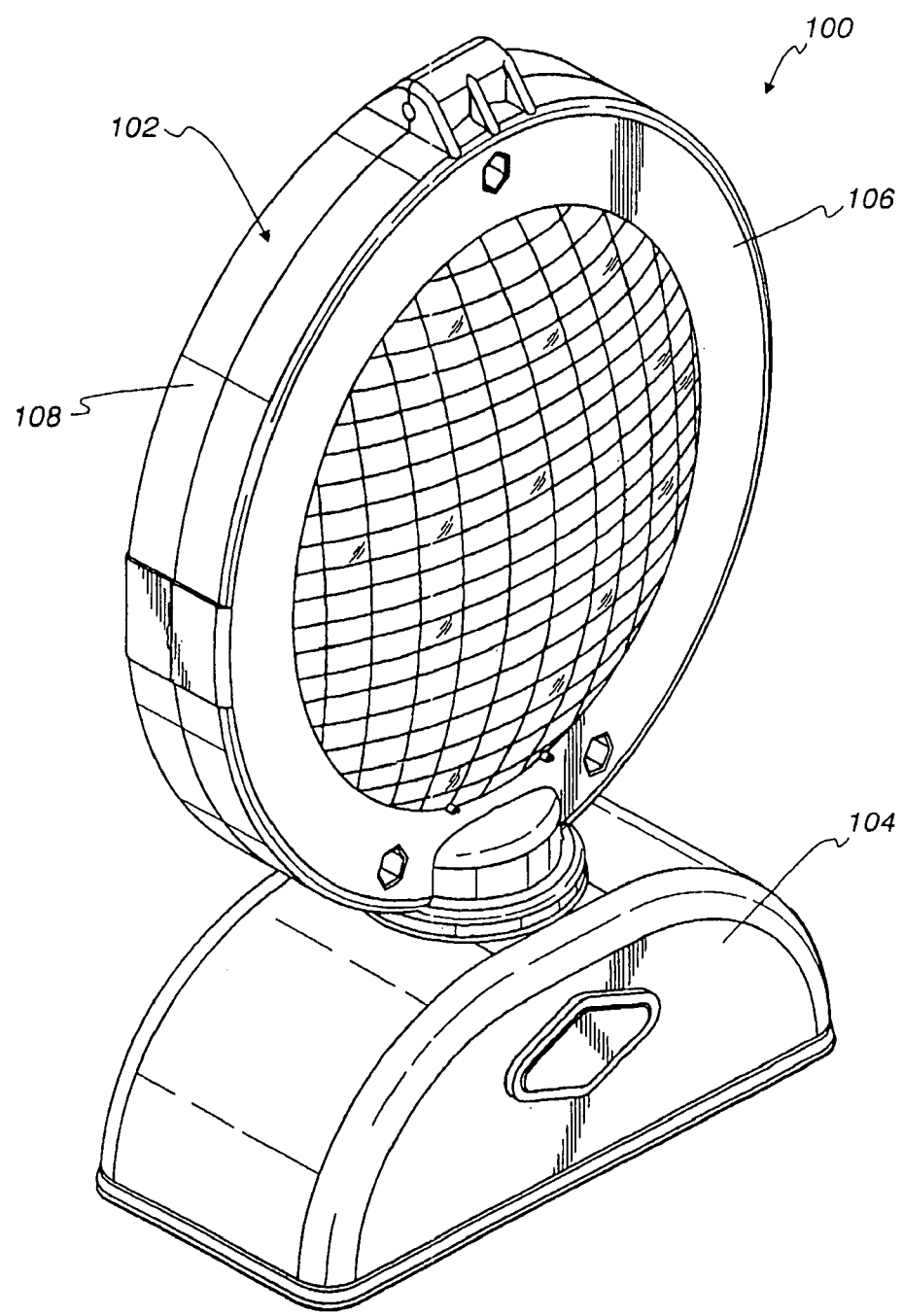
FIG. 1 is a perspective view of a warning light representing one implementation of the invention.
Figure 2:
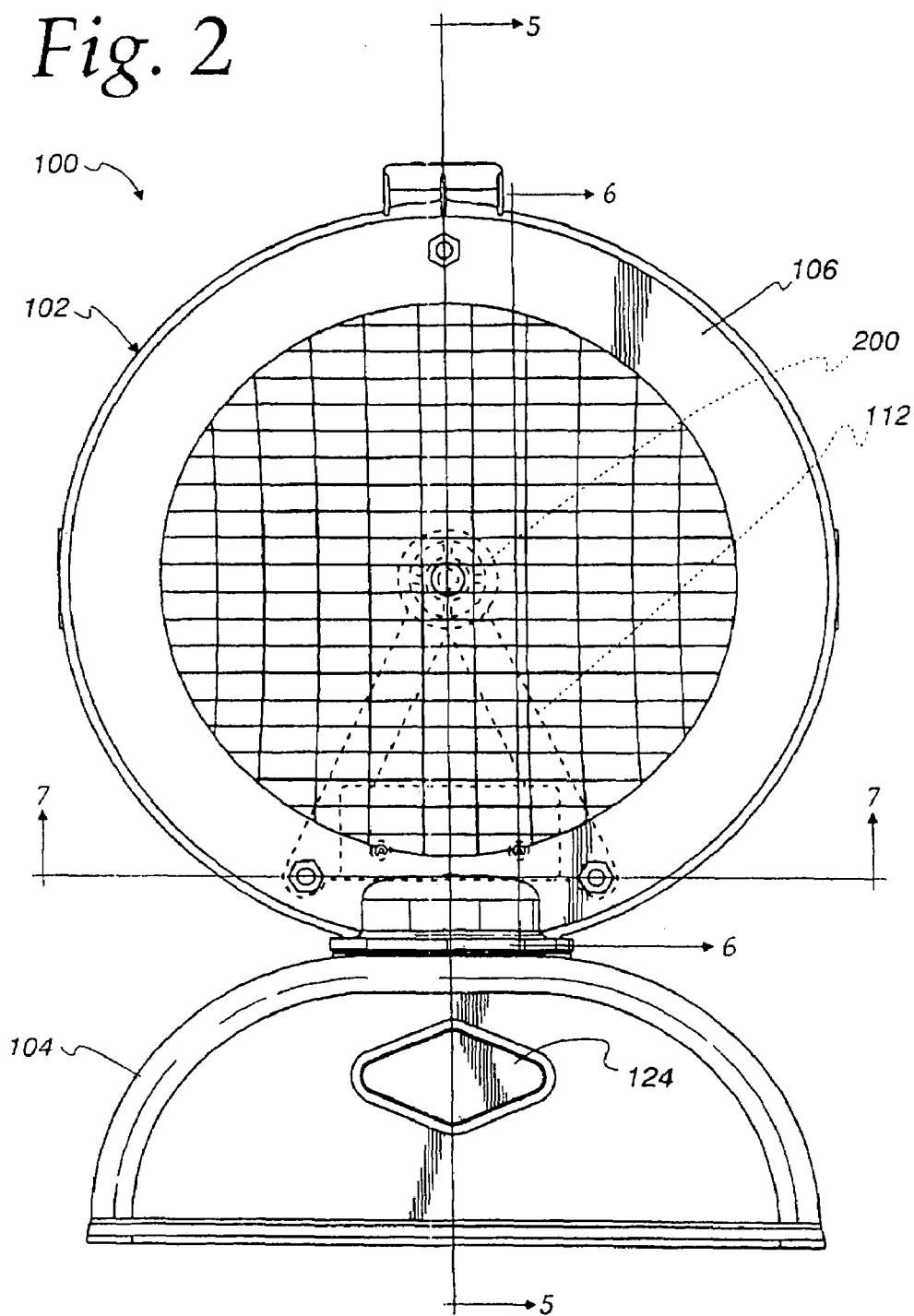
FIG. 2 is a front elevational view thereof.

Turning to FIG. 1, an apparatus 100 in one example comprises in certain aspects, a warning light which is portable, battery powered and which can be conveniently mounted to barricades and other traffic channelizing devices, as well as a wide variety of other structures such as vehicles and buildings, for example.

The warning light apparatus 100 includes a lens assembly 102 mounted atop a base housing 104. Apparatus 100 has found immediate commercial application as a barricade warning light. Although apparatus 100 can accommodate incandescent lamps, it is generally preferred that commercially available LED lamps be employed as the light source. As is known in the art, LED lamps require considerably greater care in focusing their light output with respect to the surrounding lens members. As will be seen herein, improved lamp focusing features and improved protection of the lamp and other delicate components from shock and moisture is provided by the present invention.

Figure 3:
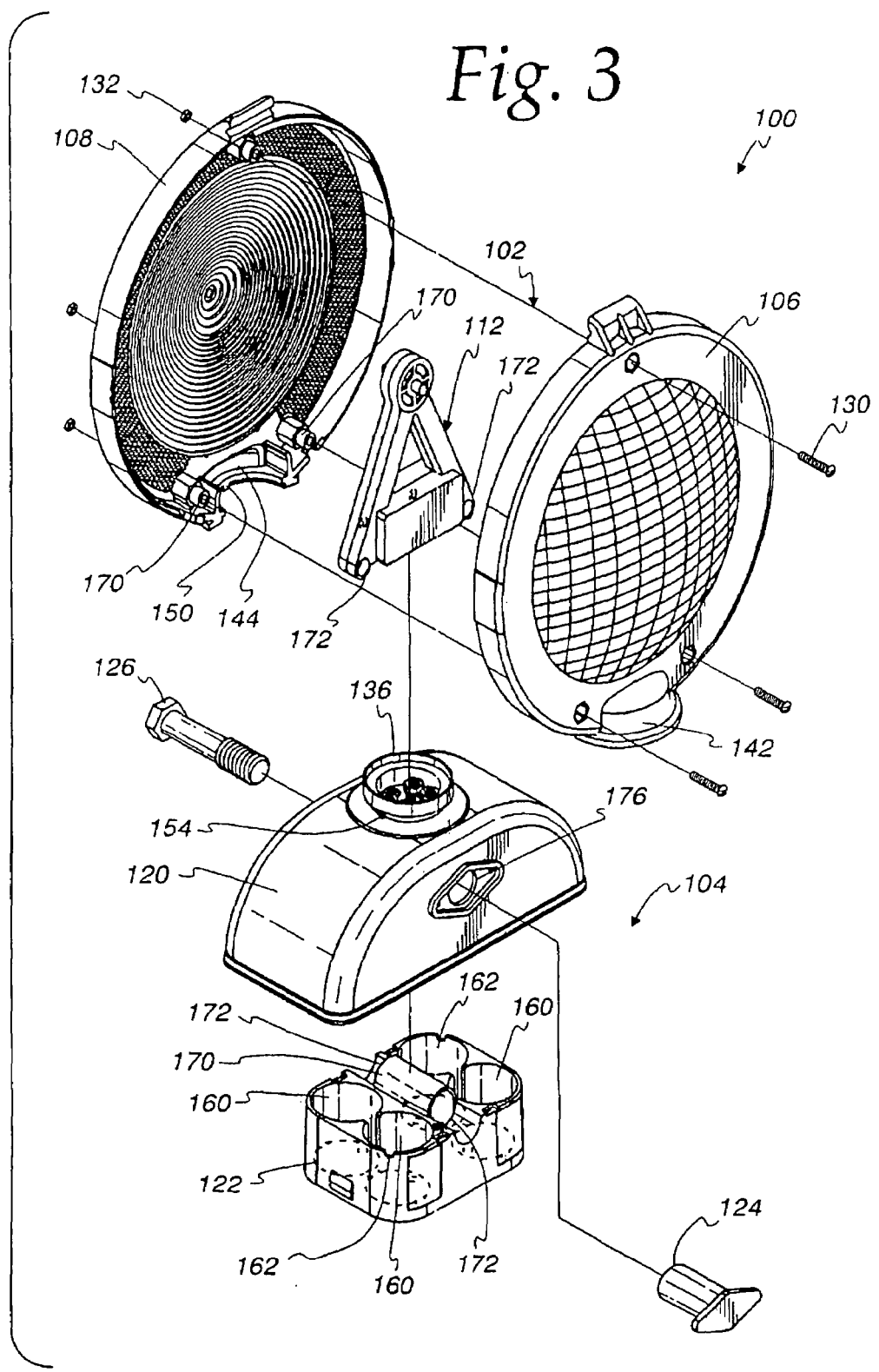
FIG. 3 is an exploded perspective view thereof

Referring to FIG. 3, the lens assembly 102 and base housing 104 of apparatus 100 are shown in greater detail. The lens assembly 102 includes front and rear lens members 106, 108 and an internal, generally triangular shaped assembly 112. The lens members have central portions which include fresnel lens elements or other focusing structures. Base housing 104 includes a housing 120, a battery tray 122 and an optional threaded fastener 124 and cooperating nut 126. The lens members 106, 108 are secured together using a plurality of screws 130 and cooperating nut fasteners 132. With additional reference to FIG. 4, housing 120 includes a neck structure 136, while lens members 106, 108 include cooperating collar members 142, 144, respectively. As indicated in the cross-sectional view of FIG. 5, collar members 142, 144 hold neck 136 captive. Preferably, the neck structure 136, and hence base housing 104, is free to rotate within the cooperating collar members 142, 144. It has been found convenient to provide a rotation stop, limiting rotation of the lens assembly 102 about base housing 104 to a 90° movement. Projections of lugs 150 on one or both collar members 142, 144 engage a fin-like projection 154 on neck 136 (see FIGS. 3 and 4).

Figure 5:
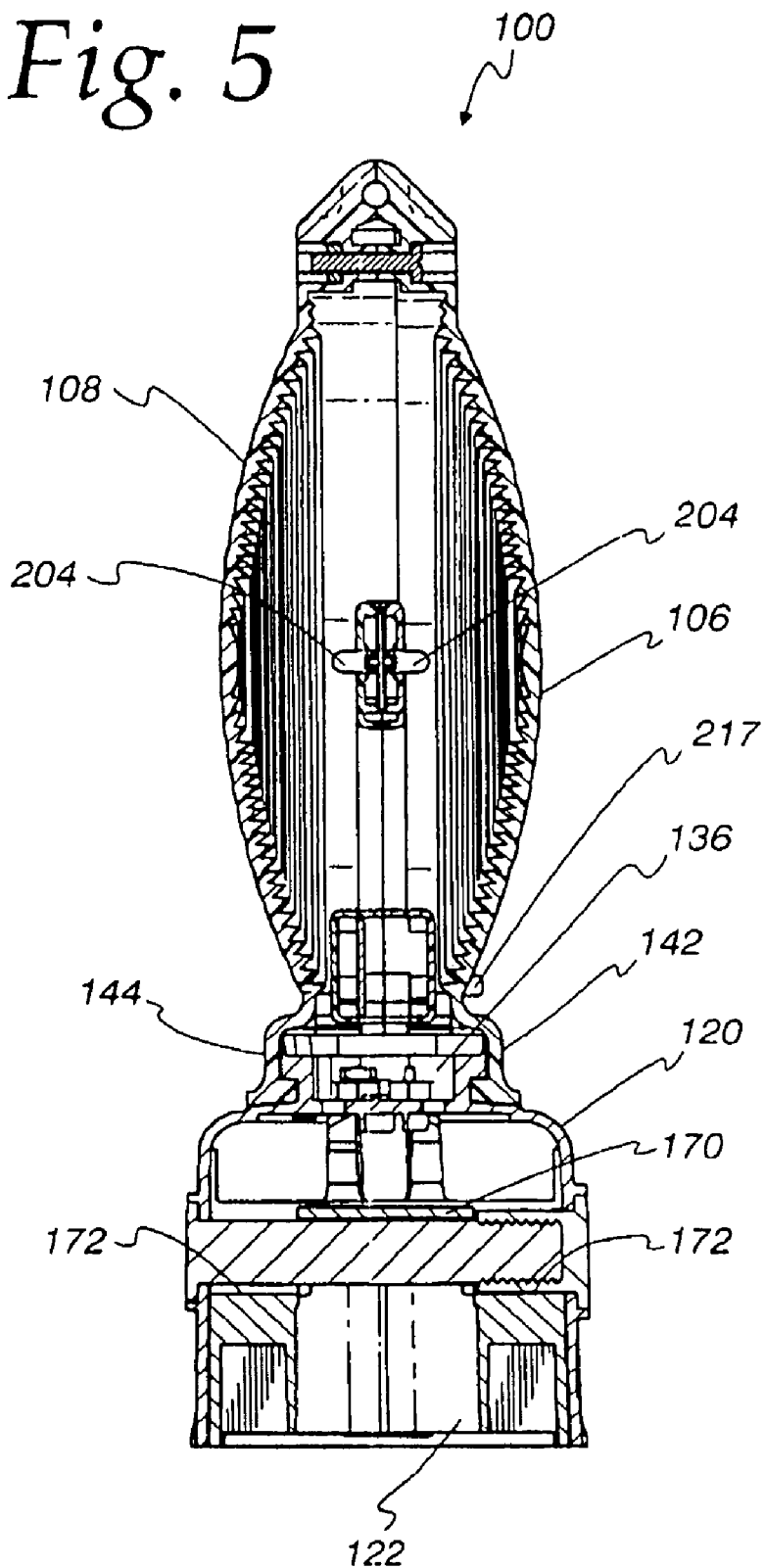
FIG. 5 is a cross-sectional view taken along the line 5—5 of FIG. 2.
Figure 6:
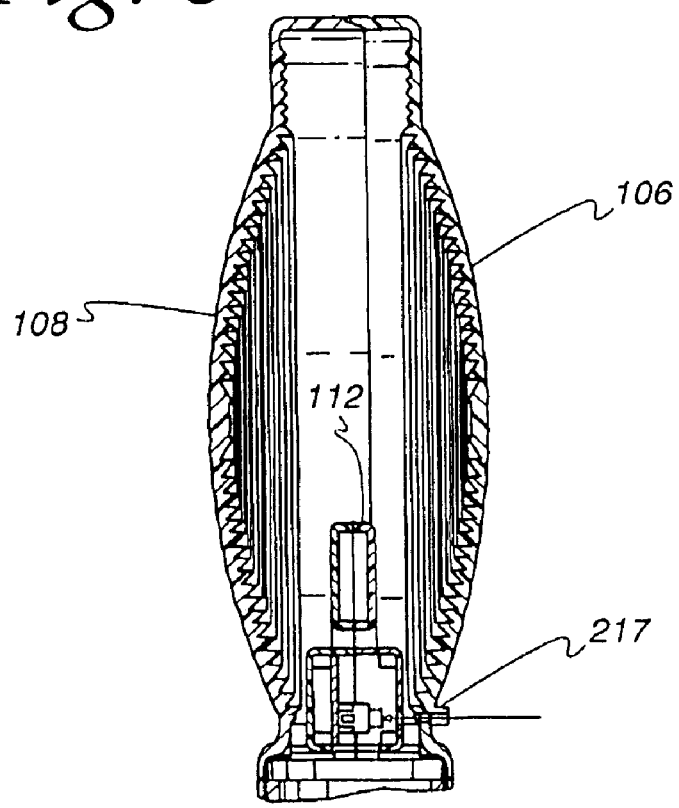
FIG. 6 is a fragmentary cross-sectional view taken along the line 6—6 of FIG. 2.

Preferably, the mating lens members 106, 108 provide a secure water-tight seal when joined together in the manner illustrated, for example, in FIGS. 5 and 6. If desired, an O-ring or other gasket material can be accommodated between the lens elements, although this has not been found to be necessary. Should any leakage or moisture condensation occur, the moisture is guided by the lens members 142, 144 away from the internal assembly 112 and the battery tray 122.

Figure 4:
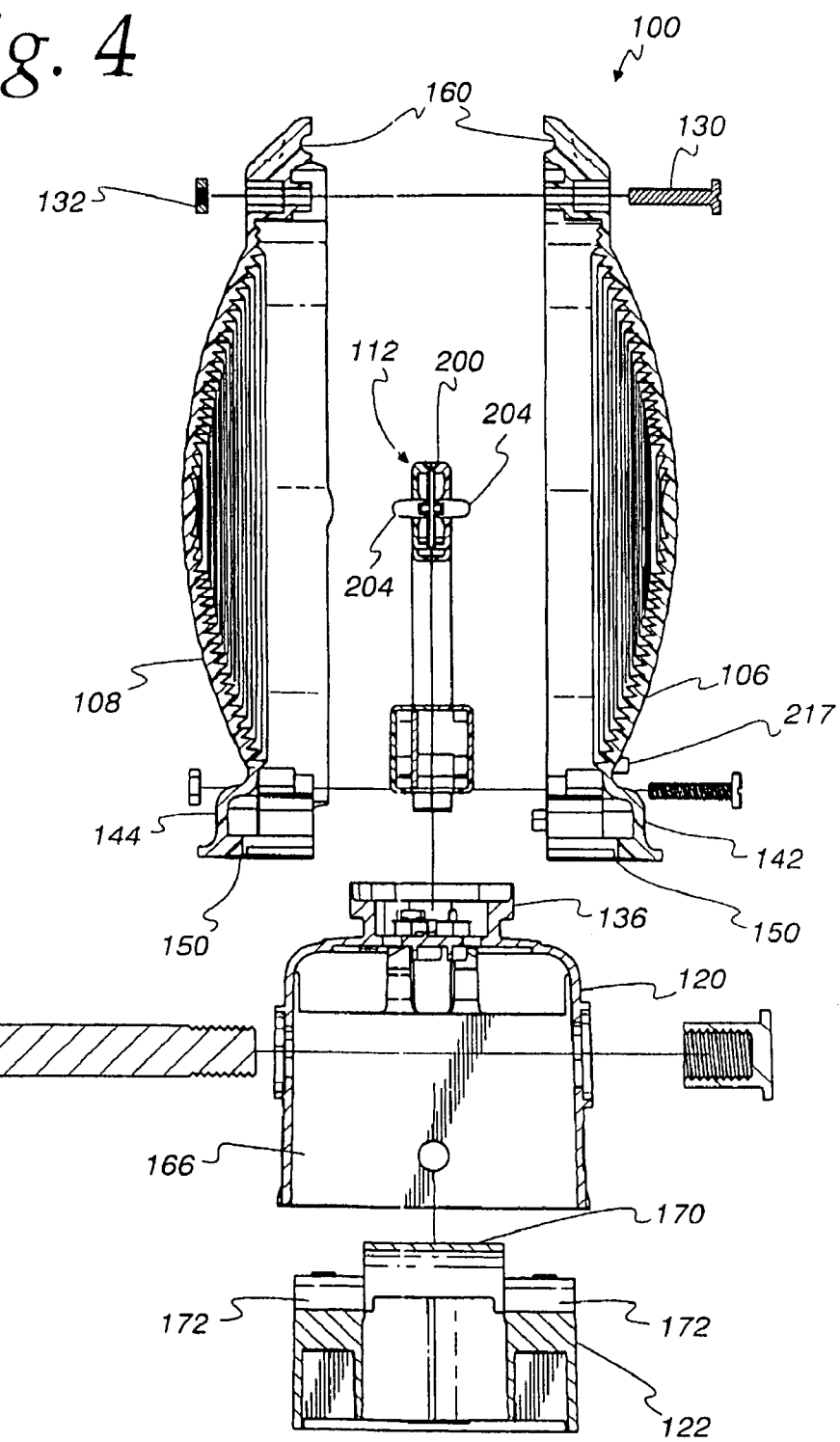
FIG. 4 is an exploded cross-sectional view taken along the line 5—5 of FIG. 2.

Referring now to FIGS. 3–5, battery tray 122 holds a plurality of dry cell batteries in an upright position, that is, with their central axes aligned in a vertical direction. By orienting the batteries in a vertical direction, it has been found that their operation is substantially improved. The batteries (not shown) are received in cylindrical pockets 160 shown for example in FIG. 3. As can be seen in FIG. 3, notches 162 are formed at opposing diagonal corners of the battery pocket array to provide a convenient tactile indication to a workman that these battery pockets are to receive batteries in an upright position. When employing conventional batteries, the positive polarity ends of the dry cell batteries are located in an upright position. Thus, a workman can conveniently recharge the batteries of the warning light apparatus in the dark, or in inclement weather. With reference to FIG. 4, the battery tray 122 is telescopically inserted into the hollow interior 166 of housing 120. The battery tray 122 is reversible, that is, it's shape is symmetrical so as to allow the battery tray to be inserted in housing 120 in either of two rotational positions, while providing the desired electrical connection with terminals located at the upper end of housing 120.

The battery tray 120 includes a central cylinder 170 and adjacent recesses 172 for receiving threaded fastener 124 which is threaded through openings 176 in walls of housing 120. In this manner, the threaded fastener, located at approximately the center of mass of the batteries carries the weight of the batteries in an efficient manner. Alternatively, if threaded fastener 124 is to be omitted, battery tray 122 and is provided with conventional engagements with housing 120, such as threaded fasteners or snap-fit interlocking members. It is a generally preferred that housing 120 be made of conventional plastic material to provide the resilience needed for the snap-fit engagements. It is also generally preferred that the lens members 106, 108 internal assembly 112 and the battery tray 122 also be made of suitable plastic material to provide for economies of fabrication as well as weather resistance when employed out of doors. If desired, however, one or more of the components of apparatus 100 can be made of other known materials.

Referring now to figures two and three, internal assembly 112 is mounted in a fixed position within lens members 106, 108. Lens member 108 includes bosses 170 received in recesses 172 in the lower corners of internal assembly 112, preferably, with a tight fit. This close fitting arrangement and is a generally triangular shape of inner assembly 112 provides improved precision locating of the LED lamps with respect to the optical centers of lens elements 106, 108. With additional reference now to FIGS. 8 and 9, inner assembly 112 includes first and second generally triangular shaped housings 180, 182. When mated, housings 180, 182 cooperate to form a generally continuous, hollow triangular passageway. Located within the hollow passageway are first and second circuit boards 190, 192 carrying components which are connected together with one or more electrical wires 194. The housings 180, 182 may be joined together with virtually any conventional means available, including pin and recess friction fit, ultrasonic welding or adhesives. Preferably, the mating joinder of housings 180, 182 results in a water-tight hollow structure which provides a second measure of moisture rejection, adding to that of the mating lens members 106, 108. Should failure of the waterproof features result from unintentional impact or the like, any moisture within the hollow housing of inner assembly 112 is channeled away from the electrical components, and allowed to exit through a bottom opening 179 shown for example in FIG. 9. Due to the triangular shape of the housing of inner assembly 112, moisture is automatically and reliably channeled to either side of circuit board 192 and the components contained thereon. As can be seen for example in FIG. 8, continuous walls 221 surround the circuit board 192 thus providing an additional, third line of moisture protection.

In the preferred embodiment, circuit board 190 is a generally circular and includes alignment recesses 198 which can be mated with optional projections (not shown) located within a generally cylindrical portion 200 located at the upper corner of the triangular structure. As can be seen for example in FIGS. 4 and 5, circuit board 190 carries a pair of LED lamps 204 positioned back-to-back. The LED lamps are received in central openings 206 formed in the upper ends of housings 180, 182, preferably with a tight fit which holds the LED lamps on-axis with considerable precision. This feature, in combination with the precision mounting mounting of inner assembly 112 within the lens members 106, 108 provides a doubly waterproof lamp assembly with precision alignment of the LED light output and the light focusing elements of lens members 106, 108.

Figure 7:
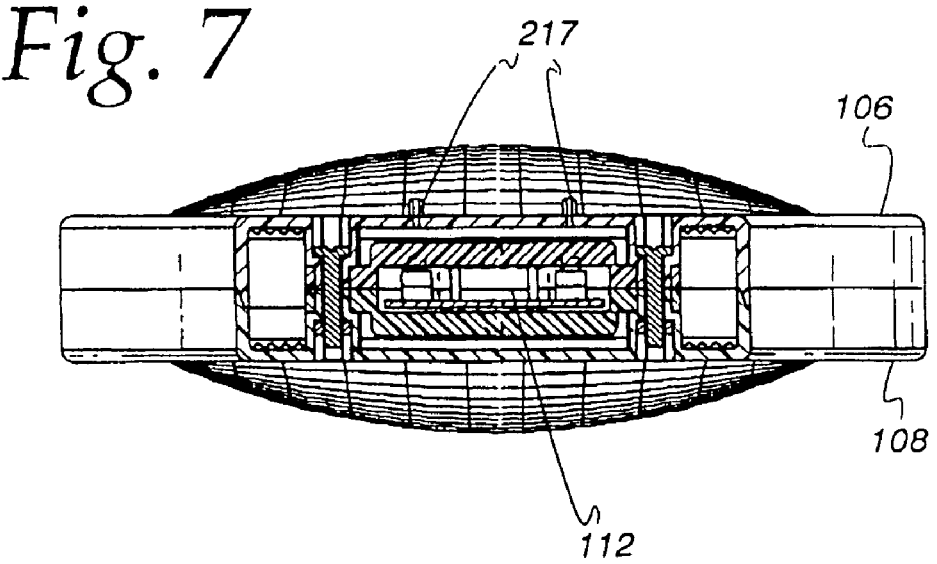
FIG. 7 is a fragmentary cross-sectional view taken along the line 7—7 of FIG. 2.

Referring again to FIGS. 8 and 9, the second circuit board 192 preferably comprises a printed circuit board of conventional construction, carrying selectively operable flashing circuitry which provides flashing and steady burn operation, as well as on/off control of the LED lamps, in a response to signals from one or more switches. As can be seen for example in FIG. 8, conventional pushbutton switches 212 are mounted on board 192 to face in a forward direction. The pushbutton switches are disposed between the battery source and the circuitry carried on circuit board 192 to control operation of the LED lamps. The pushbutton actuators of switches 212 are accessible by entry of an appropriate tool through holes 216 formed at the bottom of housing 180. Cooperating shrouded or hooded access holes 217 are formed in the bottom portion of lens element 106 to provide access to pushbutton switches 212 from outside the apparatus 100, without requiring disassembly. As can be seen for example in FIGS. 6 and 7, overlying shrouds or hoods project outwardly from lens element 106 to prevent water from entering the access holes 217. In the preferred embodiment, a paper clip or other conventional implement can be employed to allow a workman to operate apparatus 100 by pushing one or both pushbutton switches 212. Preferably, one pushbutton switch is cycled to power is the unit on and off, while the other pushbutton switch is cycled between steady burn and flashing operation of the LED lamps. The present invention contemplates other conventional controls for the operation of LED lamps 204.

Figure 8:
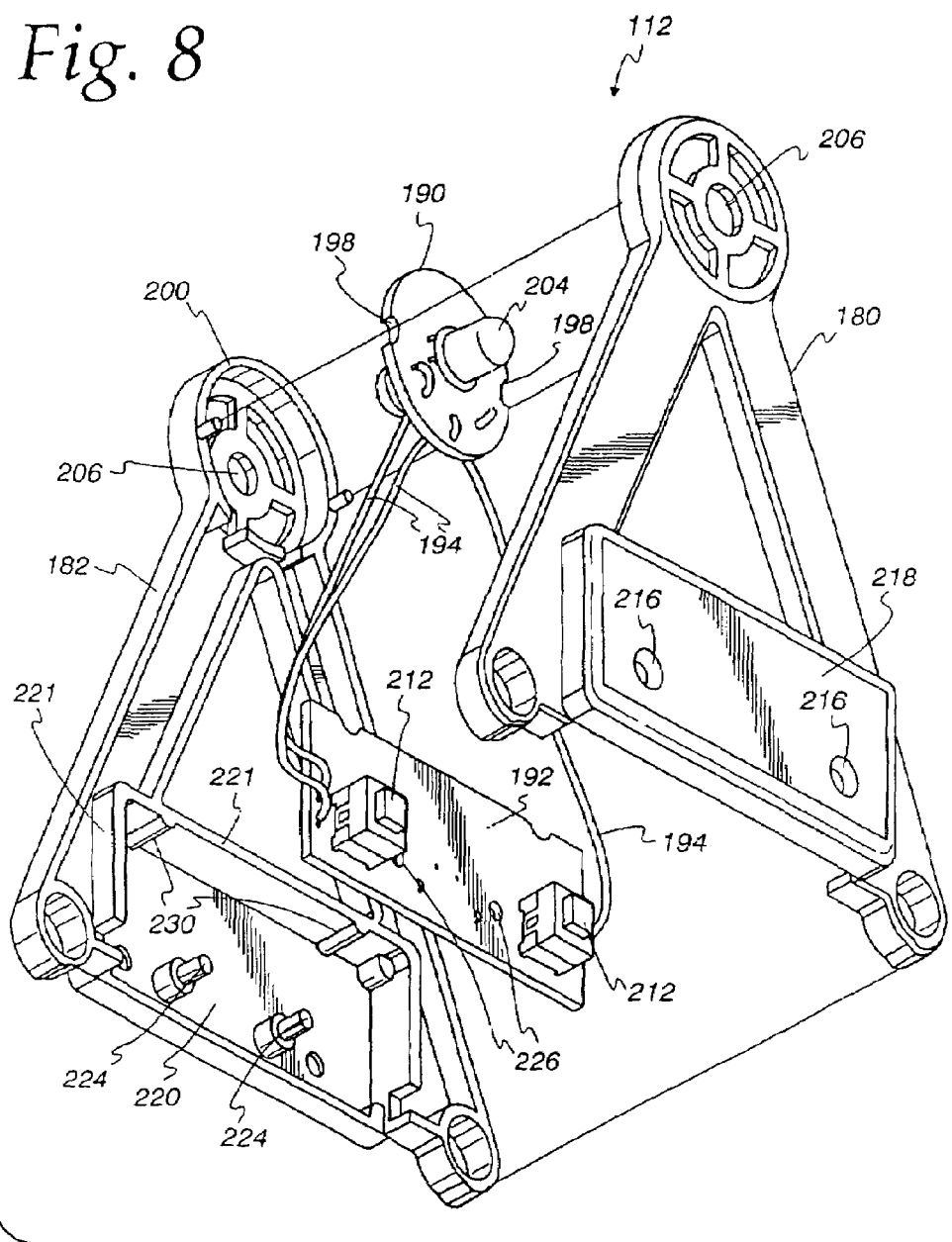
FIG. 8 is an exploded perspective view of an internal housing representing another implementation of the invention.
Figure 9:
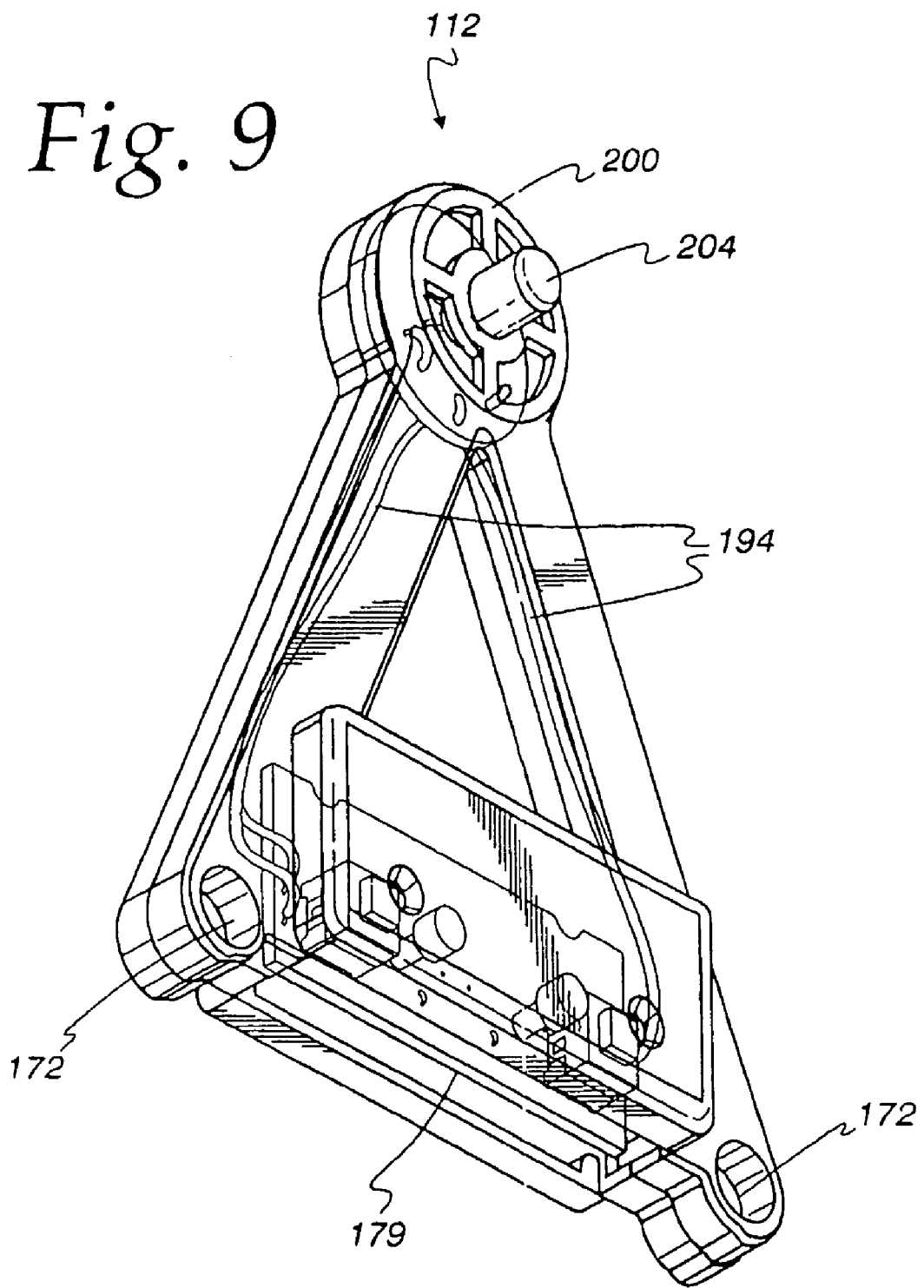
FIG. 9 is a perspective view of the internal housing.

As can be seen for example in FIG. 8, housings 180, 182 include generally rectangular pockets 218, 220 which receive circuit board 192 with a close fit. Further alignment of the circuit board 192 within housings 180, 182 is provided with alignment pins 224, which are received in holes 226 in circuit board 192. In addition, recesses are provided in the upper end of circuit board 192 for mating with ribs 230 formed in portion 220 of housing 182. As can be seen for example in FIG. 9, wiring 194 is carried within hollow legs of the triangular-shaped housing of inner assembly 112. Thus, the electrical components of inner assembly 112 are shielded from moisture, while allowing cost-effective conventional assembly techniques to be performed without requiring potting or other special operations. Wiring, not shown, extends from battery tray 122 and the conventional electrical contacts contained therein, to circuitry carried on circuit board 192 to provide a power supply therefor.

Thus, it can be seen that lamp alignment is confined to the upper portion of apparatus 100, encased between the lens elements 106, 108. By providing securement between the inner assembly and the lens elements at the two lower points of the triangular housing of the inner assembly, alignment between the LED lamps and the lens elements is made unusually stable. Further, alignment of the LED lamps is maintained independent from the lens housing base and the relatively massive batteries contained therein. Further, mounting for apparatus 100 is provided at the mounting base with vibrations being isolated from components housed within the interior assembly. Further, various levels of inter nested moisture protection is provided for the electric components carried on the circuit board.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. Warning light apparatus, comprising:
a lens assembly comprising mating first and second lens members forming a hollow interior;
an internal assembly within the hollow interior of the lens, including a generally triangular-shaped inner housing having a hollow interior;
the generally triangular-shaped inner housing including an upper corner, a pair of lower corners and hollow leg portions between the corners;
at least one LED lamp disposed in the hollow interior of the inner housing, at the upper corner thereof;
a first circuit board carrying at least one switch disposed in the hollow leg portion extending between the lower corners of the inner housing;
electrical wiring disposed in at least one leg portion, electrically coupling the at least one LED lamp to the switch;
a base comprising a base housing defining a hollow interior and a battery holder received within said hollow interior of the base housing;
a cylindrical housing portion at the upper corner of said inner housing; and
a second circuit board carrying said at least one LED lamp, disposed within said cylindrical housing portion.

2. The apparatus of claim 1 wherein the inner housing includes an inner wall at least partially surrounding said first circuit board and cooperating with the remainder of said inner housing to at least partially encapsulate said first circuit board.

3. The apparatus of claim 1 wherein said second circuit board is a generally circular.

4. The apparatus of claim 3 wherein said at least one LED lamp extends generally perpendicular to said second circuit board.

5. The apparatus of claim 4 further comprising a second LED lamp supported by said second circuit board.

6. The apparatus of claim 5 wherein said at least one and said second LED lamps are coaxially aligned and face away from one another.

7. The apparatus of claim 1 wherein said first circuit board carries first and second switches controlling operation of said at least one LED lamp.

8. The apparatus of claim 7 wherein at least one of said first and said second lens members and the inner housing define aligned holes communicating with one another to form a passageway communicating with said at least one switch, whereby said at least one switch is activatable from outside of said lens assembly.

9. The apparatus of claim 1 wherein said battery holder is telescopically received in said base housing.

10. The apparatus of claim 9 wherein said battery holder includes pockets for aligning a plurality of batteries in a vertical orientation.

11. The apparatus of claim 10 wherein said battery holder defines notches adjacent preselected ones of said pockets for tactile indication of the direction of insertion of said batteries in said preselected ones of said pockets.

12. The apparatus of claim 1 wherein said first circuit board carries first and second switches and flashing circuitry for selectively operable flashing operation of said LED lamp, with a first of said switches defining one of said flashing and said steady burn operation of said LED lamp and the second of said switches selectively operable to energize and deenergize said LED lamp.

13. Warning light apparatus, comprising:
a lens assembly comprising mating first and second lens members forming a hollow interior;
an internal assembly within the hollow interior of the lens, including a generally triangular-shaped inner housing having a hollow interior;
the generally triangular-shaped inner housing including an upper corner, a pair of lower corners and hollow leg portions between the corners;
at least one LED lamp disposed in the hollow interior of the inner housing, at the upper corner thereof;
a first circuit board carrying at least one switch disposed in the hollow leg portion extending between the lower corners of the inner housing;
electrical wiring disposed in at least one leg portion, electrically coupling the at least one LED lamp to the switch; and
a base comprising a base housing defining a hollow interior and a battery holder received within said hollow interior of the base housing;
the inner housing including an inner wall at least partially surrounding said first circuit board and cooperating with the remainder of said inner housing to at least partially encapsulate said first circuit board;
a second LED lamp;
a second circuit board disposed within said cylindrical housing portion;
said at least one and said second LED lamps carried by said second circuit board so as to be coaxially aligned with one another, generally perpendicular to said second circuit board and facing away from one another; and
said cylindrical housing portion includes a pair of holes for receiving respective ones of said at least one and said second LED lamps.

14. Warning light apparatus, comprising:
a lens assembly comprising mating first and second lens members forming a hollow interior;
an internal assembly within the hollow interior of the lens, including a generally triangular-shaped inner housing having a hollow interior;
the generally triangular-shaped inner housing including an upper corner, a pair of lower corners and hollow leg portions between the corners;
collar members at the lower corners of said inner housing, and at least one of said first and said second lens members including a pair of mounting bosses received in said collar members to support and align said internal assembly with respect to at least one of said first and said second lens members;
first and second LED lamps disposed in the hollow interior of the inner housing, at the upper corner thereof;
a first circuit board carrying at least one switch disposed in the hollow leg portion extending between the lower corners of the inner housing;
the inner housing including an inner wall at least partially surrounding said first circuit board and cooperating with the remainder of said inner housing to at least partially encapsulate said first circuit board;
electrical wiring disposed in at least one leg portion, electrically coupling said first and said second LED lamps to the switch;

a base comprising a base housing defining a hollow interior and a battery holder received within said hollow interior of the base housing;

a second circuit board disposed within said cylindrical housing portion;

said first and said second LED lamps carried by said second circuit board so as to be coaxially aligned with one another, generally perpendicular to said second circuit board and facing away from one another; and said cylindrical housing portion includes a pair of holes for receiving respective ones of said at least one and said second LED lamps.

15. Warning light apparatus, comprising:

a lens assembly comprising mating first and second lens members forming a hollow interior;

an internal assembly within the hollow interior of the lens, including a generally triangular-shaped inner housing having a hollow interior;

the generally triangular-shaped inner housing including an upper corner, a pair of lower corners and hollow leg portions between the corners;

at least one LED lamp disposed in the hollow interior of the inner housing, at the upper corner thereof;

a first circuit board carrying at least one switch disposed in the hollow leg portion extending between the lower corners of the inner housing;

electrical wiring disposed in at least one leg portion, electrically coupling the at least one LED lamp to the switch;

a base comprising a base housing defining a hollow interior and a battery holder received within said hollow interior of the base housing; and collar members at the lower corners of said inner housing, and at least one of said first and said second lens members including a pair of mounting bosses received in said collar members to support and align said internal assembly with respect to at least one of said first and said second lens members.

16. Warning light apparatus, comprising:

a lens assembly comprising mating first and second lens members forming a hollow interior;

an internal assembly within the hollow interior of the lens, including a generally triangular-shaped inner housing having a hollow interior;

the generally triangular-shaped inner housing including an upper corner, a pair of lower corners and hollow leg portions between the corners;

at least one LED lamp disposed in the hollow interior of the inner housing, at the upper corner thereof;

a first circuit board carrying at least one switch disposed in the hollow leg portion extending between the lower corners of the inner housing;

electrical wiring disposed in at least one leg portion, electrically coupling the at least one LED lamp to the switch; and a base comprising a base housing defining a hollow interior and a battery holder received within said hollow interior of the base housing;

the inner housing including an inner wall at least partially surrounding said first circuit board and cooperating with the remainder of said inner housing to at least partially encapsulate said first circuit board; and collar members at the lower corners of said inner housing, and at least one of said first and said second lens members including a pair of mounting bosses received in said collar members to support and align said internal assembly with respect to at least one of said first and said second lens members.

* * * * *